(No Model.)

C. A. A. RAND.
AUTOMATIC SELF BINDER.

No. 545,172. Patented Aug. 27, 1895.

5 Sheets—Sheet 1.

Witnesses
Arthur Johnson
Wm Rapelje

Inventor
Charles A. Anderson Rand

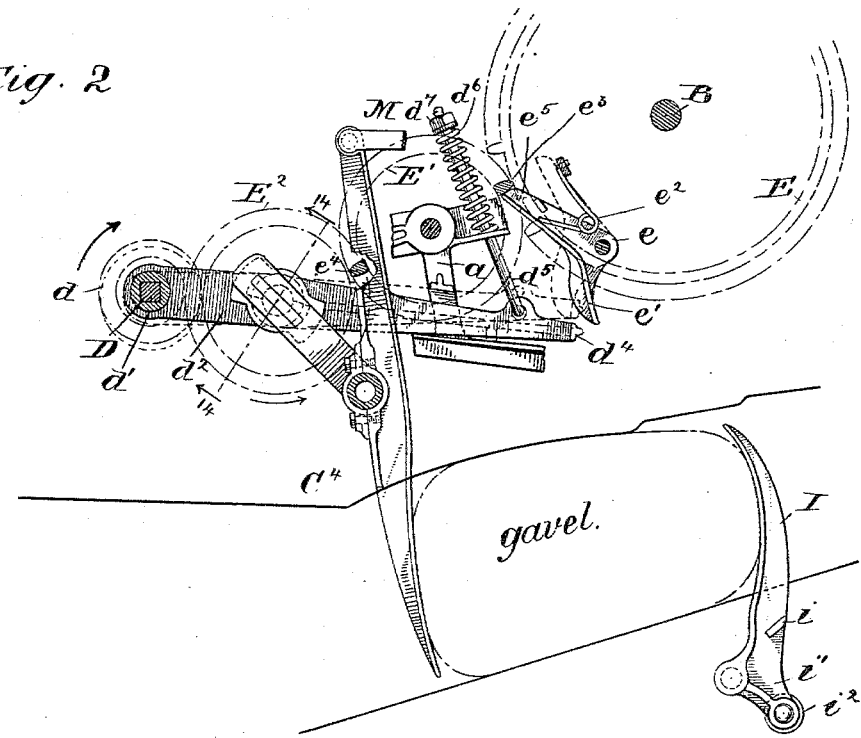
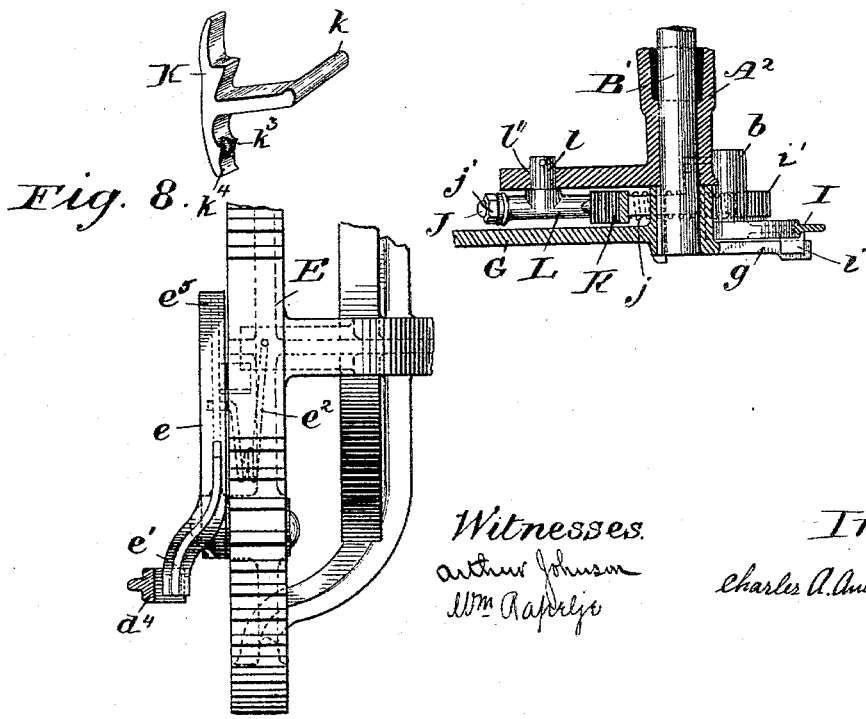

(No Model.) 5 Sheets—Sheet 3.

C. A. A. RAND.
AUTOMATIC SELF BINDER.

No. 545,172. Patented Aug. 27, 1895.

Witnesses.
Arthur Johnson.
Wm Rahrje

Inventor.
Charles A. Anderson Rand (No Model.) 5 Sheets—Sheet 4.
C. A. A. RAND.
AUTOMATIC SELF BINDER.
No. 545,172. Patented Aug. 27, 1895.
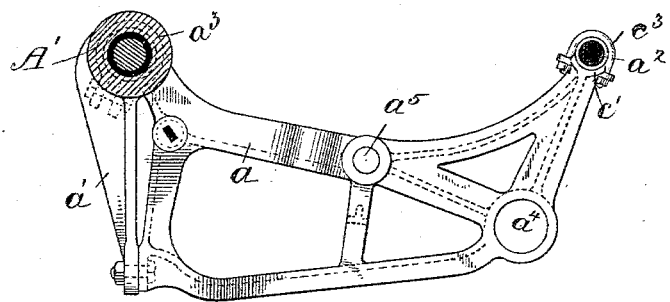
Fig. 10.
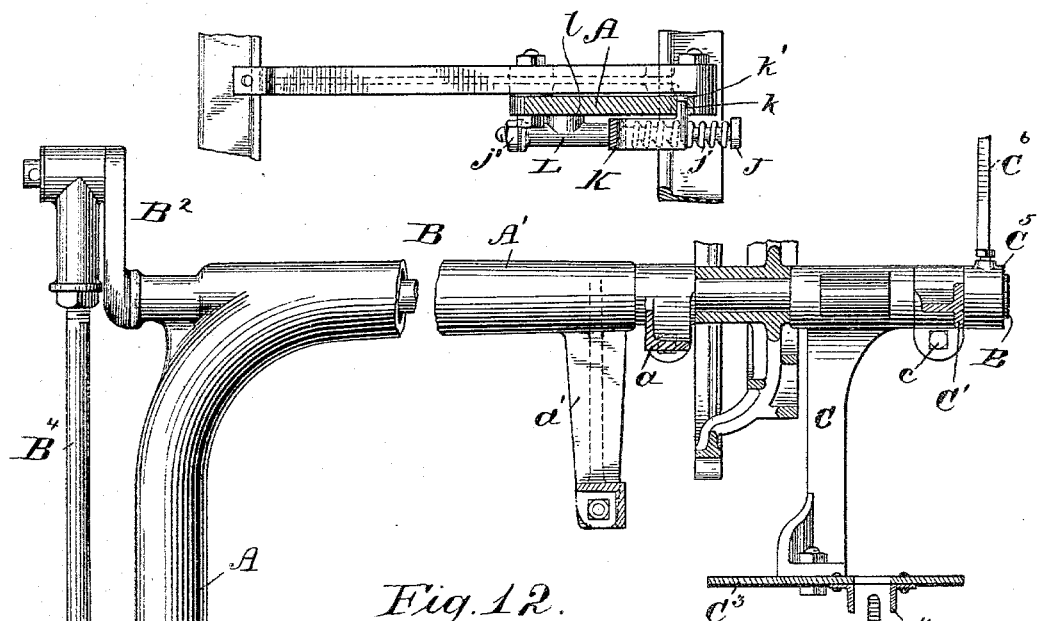
Fig. 11.
Fig. 12.
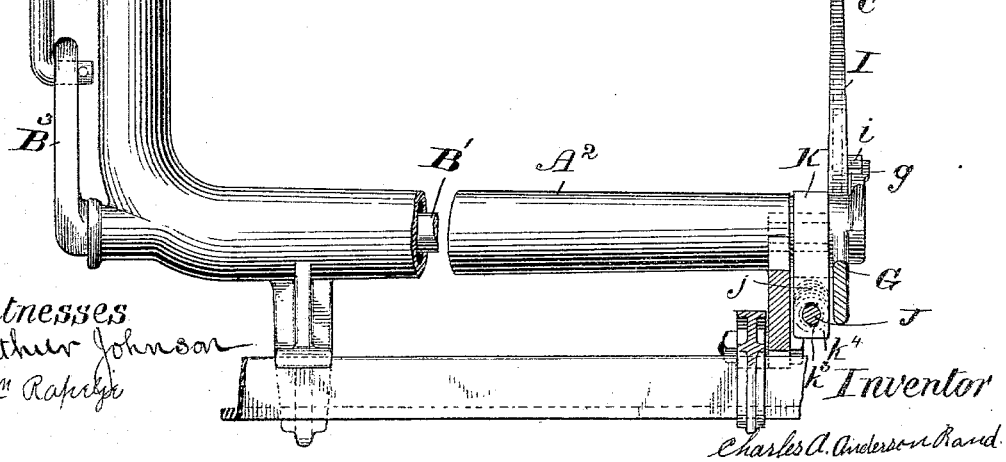
Witnesses
Arthur Johnson
Wm Rapelje
Inventor
Charles A. Anderson Rand.

(No Model.)  5 Sheets—Sheet 5.

C. A. A. RAND.
AUTOMATIC SELF BINDER.

No. 545,172.  Patented Aug. 27, 1895.

Witnesses.
Arthur Johnson
Wm Rapelje

Inventor
Charles A. Anderson Rand

UNITED STATES PATENT OFFICE.

CHARLES A. ANDERSON RAND, OF CHICAGO, ILLINOIS.

AUTOMATIC SELF-BINDER.

SPECIFICATION forming part of Letters Patent No. 545,172, dated August 27, 1895.

Application filed March 20, 1893. Serial No. 466,961. (No model.)

*To all whom it may concern:*

Be it known that I, CHARLES A. ANDERSON RAND, of Chicago, in the county of Cook and State of Illinois, have invented certain new and useful Improvements in Automatic Self-Binders, of which the following is a full description, reference being had to the accompanying drawings, in which—

Figure 1:
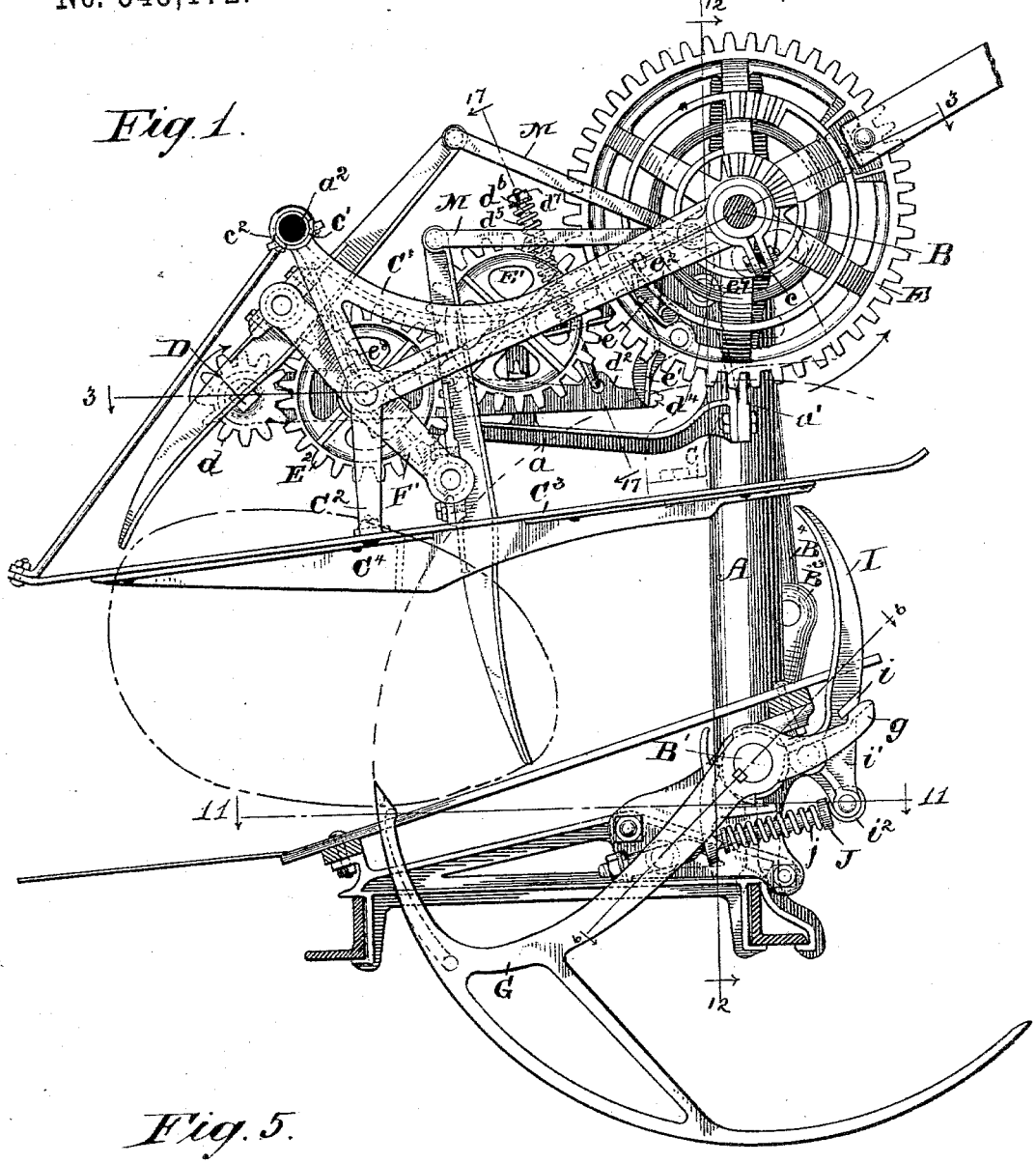
Figure 5:
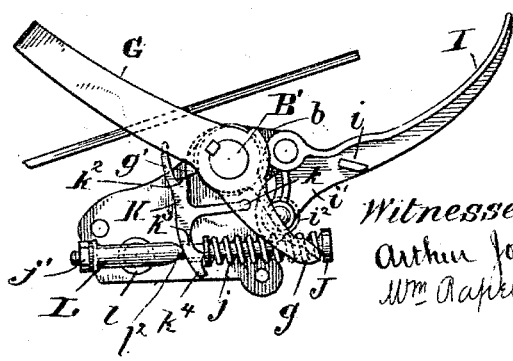
Figure 3:
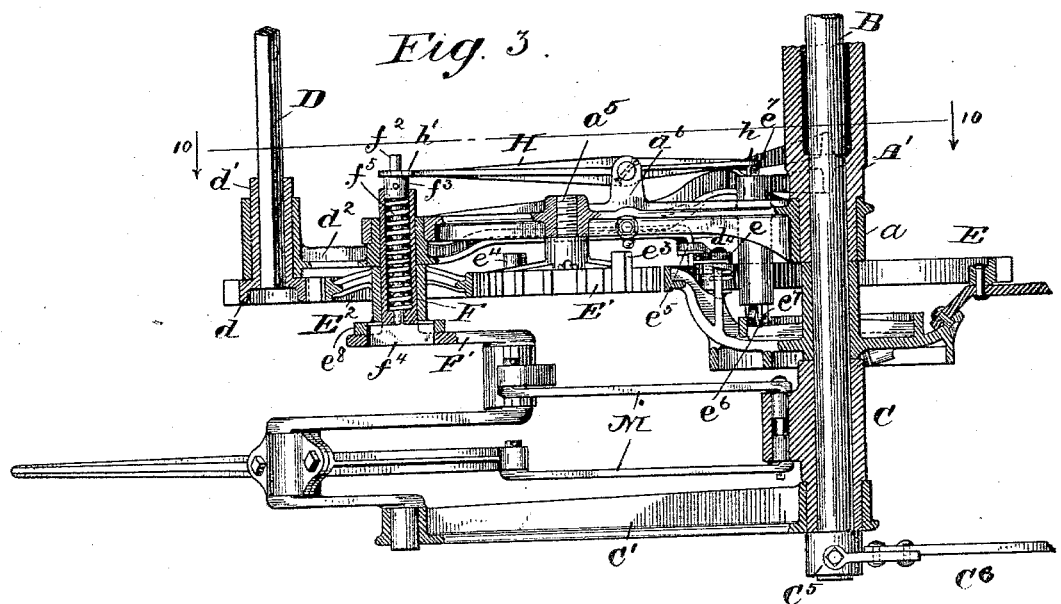
Figure 4:
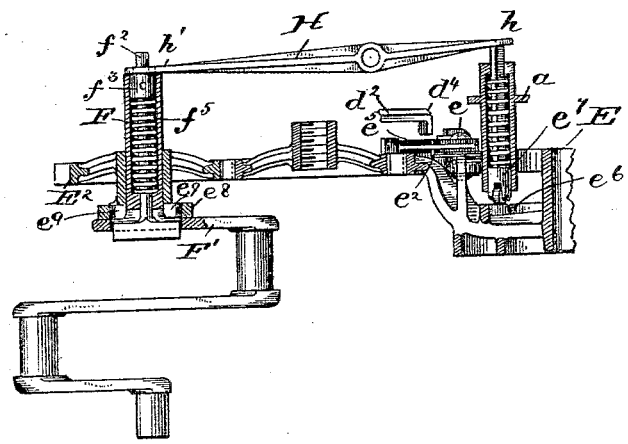
Figure 9:
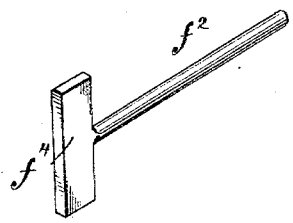
Figure 13:
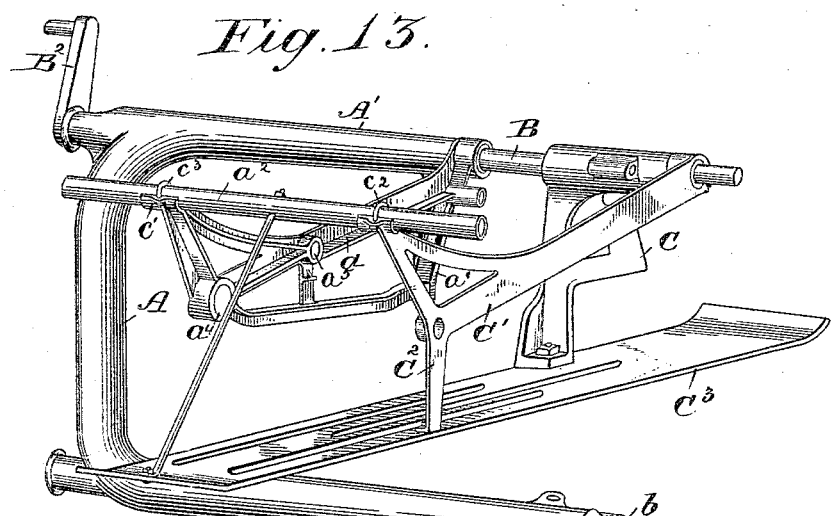
Figure 14:
Figure 15:
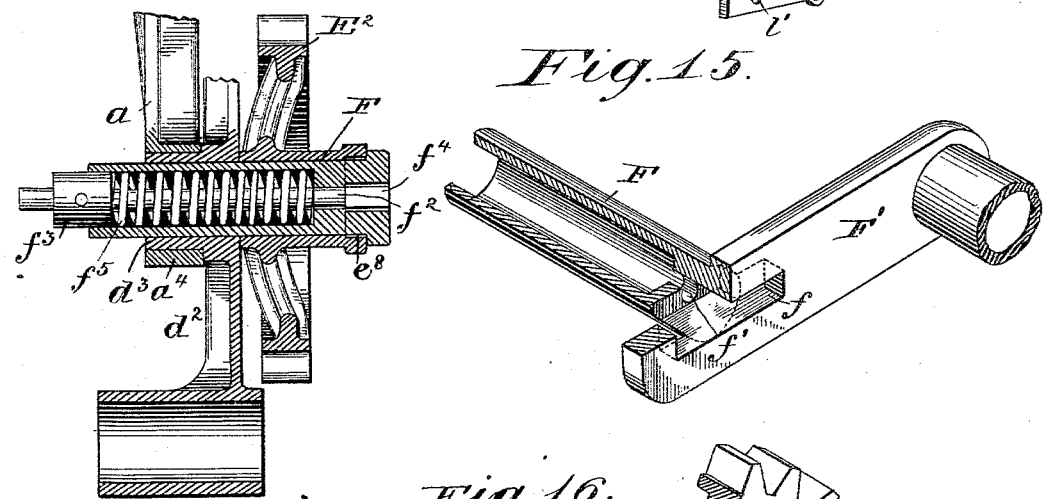
Figures 16, 17:
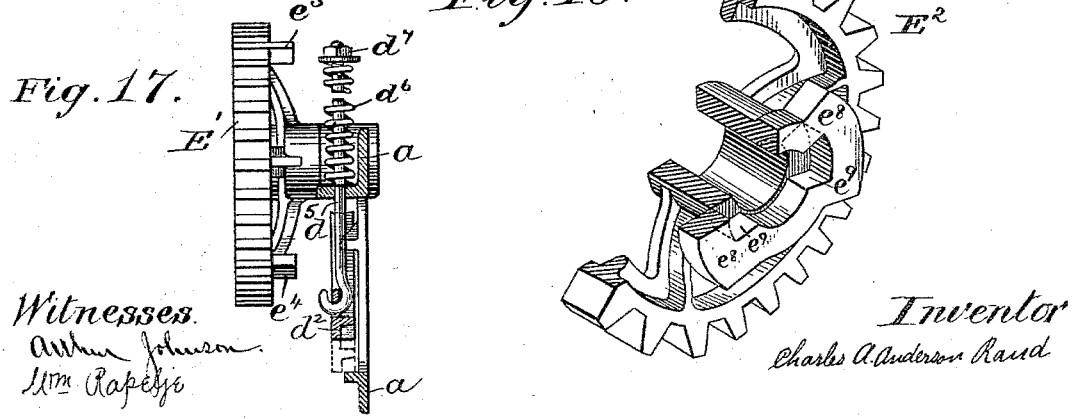

Figure 1 is a rear elevation; Fig. 2, a rear elevation of the parts immediately concerned in packing and self-sizing the gavels preparatory to binding; Fig. 3, a sectional plan view of the same parts as if cut on the line 3 3 of Fig. 1. Fig. 4 is a sectional plan view of the clutching devices, consisting of means for putting the main binder-gearing in movement and stopping the movement of the packers. Fig. 5 is a detail of the elastically-held tripping compressor-arm and means for actuating the same. Fig. 6 is a view of the same parts as if cut on the line 6 6 of Fig. 1. Fig. 7 is a perspective view of the compressor-tripping device. Fig. 8 is a detail view of the tripping-dog. Fig. 9 is a perspective view of the moving member of the clutching mechanism that starts the packing devices and permits them to stop. Fig. 10 is a section on line 10 10 of Fig. 3. Fig. 11 is a sectional view of the compressor sustaining and tripping devices as if cut on the line 11 11 of Fig. 1. Fig. 12 is a grain side view of the main binder-frame with certain parts shown in section, as if cut on the line 12 12 of Fig. 1. Fig. 13 is a perspective view of the main binder-frame and supports for the knotting devices and packer-shaft. Fig. 14 is a section on the line 14 14 of Fig. 2. Fig. 15 is a perspective view, partly in section, of one of the journals of the packer-shaft. Fig. 16 is a perspective view, partly in section, of one of the gears. Fig. 17 is a sectional detail of the clutching devices that control the action of the binding devices on the line 17 17 of Fig. 1.

The binder herein shown and described is especially adapted to use as a "platform binder"—that is, one adapted to take the grain directly from the platform upon which it falls without elevating.

I have shown a harvesting-machine, to which the binder here shown and described is especially adapted, in another application, filed June 20, 1892, Serial No. 437,372.

A is the main binder-frame, of the usual U-shaped kind, having a vertical standard and horizontal sleeves A' and A², A' being for the shaft B and A² for the shaft B'. Upon the shaft B is mounted the knotter-driving devices and the bundle-discharging arms.

Upon the sleeve-like portion of the main frame adjacent to the knotting devices an arm $a$ is secured, upon which are mounted gears for giving the packers and knotting devices movement. I have shown it as having an eye fitting closely upon the end of the sleeve, (see Fig. 10,) which I deem to be the preferable way; but it may be differently mounted. In order to prevent the arm from turning on the sleeve, I carry down from the latter a part $a'$ and bolt it to the end of the arm $a$. This arm (shown in full lines in Fig. 10) can be traced by full and dotted lines in Fig. 1. The outer end of the arm $a$ is hollowed to receive a short bar $a^2$, preferably hollow, to which other parts are connected, as shown in Fig. 13.

C is so much of the knotter-frame as necessary to illustrate my present invention. It is here shown only because it will aid in leading to a proper understanding of my present invention only in so far as it is supported and also forms a support for other parts. The knotting devices are not shown because they will form the subject-matter of another application. They are loosely supported on the rear end of the shaft B, as best seen in Figs. 3 and 12. This knotter-frame must be prevented from rotating with the shaft, to accomplish which and to furnish a support for the packer-shaft I provide the arm C'. In Fig. 3 it will be seen that this arm is made to surround the end of the knotter-frame sleeve, and Fig. 1 shows that the said arm has its eye cut out and lugs provided whereby it may be turned tightly onto the sleeve of the knotter-frame by the bolt $c$. At its outer end it is provided with the hollow $c'$, in which rests the bar $a^2$. The said bar is held in the hollow $c'$ in the recess of the outer end of the arm $a$ and in a corresponding hollow in the outer end of the arm C' by means of the yoke-bolts $c^2$ and $c^3$.

Downreaching from the main portion of the arm C' is the arm C². To this and to the knotter-frame C is secured the breast-plate C³, having the usual slot, and flanges $C^4$, through and between which the needle passes. (See Figs. 1 and 12.)

The gearing-supporting arm $a$ is provided with an eye $a^3$, that is split and provided with lugs, so as to be pinched by a bolt. (Shown in dotted lines in Fig. 10.) This arm firmly secured to the main frame and rigidly connected to the bar $a^2$, and being, besides, connected rigidly to the knotter-frame C and the arm C' a frame in the form of a parallelogram is shown, to which I secure and within which parallelogram-like frame I place my packers and the devices for clutching and unclutching the binding devices proper and for giving them and the packers movement.

In order to keep the knotter-frame C, and hence the arm C', from moving rearward, so as to let the parts of the frame spread apart, I provide a collar $C^5$, having a set-screw by which it is held firmly to the shaft. The discharge-arm $C^6$ is for convenience secured to this collar.

The prime mover of all of the parts of the binder is a shaft D, preferably square. (Shown in Fig. 3.) This shaft is journaled at one end in any convenient portion of the harvester-frame, no part of which is shown, it being sufficient for the purpose of this application to say that either the journal-bearing upon the said harvester-frame may be such as to provide a slight pivotal movement by a globe-box or other well-known means, or the said shaft may itself be provided with a universal joint.

In the arm $a'$ is an eye $a^4$, that serves indirectly as a support for the shaft by the following means: $d^2$ is a lever provided with a trunnion $d^3$, that passes into the eye $a^4$ of the arm $a$. This trunnion forms an axis upon which the said lever may rock a limited distance. The axis of this lever is coincident with that of the wheel $E^2$. (See Fig. 14.)

$d$ is the main binder-driving pinion, having a square eye into which the shaft D is inserted, and having its hub $d'$ elongated. This shaft rotates continuously in the direction indicated by the arrow in Fig. 1. To it, by means of clutching devices soon to be described, is connected the packers and the binding devices proper. The means whereby the latter are actuated will now be considered. The main binder-gear E is keyed to the shaft B. Projecting from the arm $a$ is the stud $a^5$. On this turns the intermediate gear E'. $E^2$ is another intermediate gear, that for the present moment may be considered as supported upon any suitable axis. The two intermediate gears mesh into each other and into the pinion $d$ and the gear E, by which means the latter is moved in the direction indicated by the curved arrow in Fig. 1. The knotting devices are located upon the knotter-frame so as to be operated and controlled by the wheel E, and the latter being keyed to the shaft B, that has the crank $B^2$, and the needle-shaft B', having the crank $B^3$, and the pitman $B^4$ connecting them, the needle receives its oscillations by the rotation of the said wheel.

As this binder is intended to automatically determine the proper size of the gavels to be bound, a clutching device is provided whereby the binding devices may be held in position during the accumulation thereof. The lever $d^2$ terminates in the hook $d^4$. Pivoted to the side of the wheel E is the pawl $e$, having the arm $e'$, adapted to engage the hook $d^4$ of the lever $d^2$, as seen in Fig. 1. The pawl is controlled by a spring $e^2$, one end of which is secured to the said pawl and the other to a lug on the wheel E. The two positions of the pawl are shown in Fig. 2, that in full lines being the position to which it is thrown by the spring to produce engagement of the wheel E with that of E'. Upon the wheel E' are two projections $e^3$ and $e^4$. Their location, as shown in Fig. 2, is such that as the pawl is set free and forced to the position shown in full lines in Fig. 2 they will strike upon the end $e^5$ of it.

Reference to Fig. 1 will show that the gear E is mutilated by omission of three teeth. When the parts are in the position shown in that figure, the gear E' will run idle, having no influence whatever upon the wheel E; but if the lever $d^2$ be moved so that its hook $d^4$ will draw away from the end $e'$ of the pawl $e$ the said pawl will be thrown by its spring to the position shown in Fig. 2, when the projection $e^3$ will engage the pawl and force the wheel E to rotate for a little distance, and the teeth of the wheel E' will engage those of the wheel E, and the latter will be rotated until the gear E' reaches the mutilated portion of the wheel E. As the said wheel revolves, it carries with it the pawl $e$, which is held by the spring $e^2$ in the position shown in full lines in Fig. 2. At the time the needle takes the stress of the gavel off the packers the spring $d^6$ asserts itself to raise the lever $d^2$ into the position shown in dotted lines when the hook $d^4$ lies in the orbit of the arm $e'$ of the pawl. The said arm $e'$ will engage the hook $d^4$ at a time just previous to the end of the revolution of the wheel E, and during the remainder of the revolution the hook $d^4$ will hold the arm $e'$ until the said arm assumes the position shown in dotted lines in Fig. 2, the holding of which arm forces the pawl out of engagement with the projection $e^3$ on the wheel E'. With the parts in a state of rest and the spring $e^2$ under compression, as shown by dotted lines in Fig. 2, the stress of the latter would tend to start the wheel E backward. To prevent this a notch $e^6$ is provided in the wheel E, and a spring-bolt $e^7$ having an anti-friction-roller is adapted to be forced therein. This bolt performs other offices that will soon be explained.

The means whereby the increasing gavel is instrumental in tripping the clutching devices will be understood by reference to Fig. 2, where the lever $d^2$ is shown in dotted lines in its position while the binding devices proper are held from action and in full lines as having moved to permit the clutching devices of the binding mechanism to become engaged. Let it be assumed, for the moment, that the packer-cranks are being turned positively by the gear-wheel E². Then let it be assumed that they have been rotated until the receptacle formed by the breast-plate, the binding-table, the tripping-compressor, and the packer, as shown in Fig. 2, has become filled. The packer can no longer compress the gavel. The gear E² being held from rotation, the pinion $d$ can no longer turn it, but with the said gear so held the pinion will exert itself to roll along the periphery of the gear and carry upward with it that end of the lever $d^2$, which movement will carry the end of the lever having the hook $d^4$ downward and throw it from engagement with the arm $e'$ of the pawl $e^2$, and the latter will be set free to assume the position shown in full lines in Fig. 2. As long as a sufficient amount of resistance to the movement of the packer is retained, the lever $d^2$ will be held in the position shown in full lines in Fig. 2, but the moment the pressure is released the lever will be drawn upward by the spring-rod $d^5$. This rod passes through a hole in the flange of the part $a$, above which is the spring $d^6$ and the nut $d^7$. The spring may be adjusted by turning the nut $d^7$ so as to hold it in any degree of tension while the binding devices are in position of rest.

The movement of the point of the packers is shown by dotted lines in Fig. 1, and the path traversed by the point of the needle is also there shown in dotted lines. From these lines it will be seen that the packer reaches into the grain some distance beyond the path of the needle. In order to avoid choking while the needle is up, I provide clutching devices, whereby the packers are thrown out of action while the binding devices proper are doing their work.

Reference to Fig. 14 will show that the gear E² revolves on a sleeve, which sleeve is one of the journals F of the packer-shaft. This journal is hollowed out to receive the spring $f^5$, and upon the face of the crank F' is cored out the recess $f$, and connecting this recess and the hollow for the spring is the eye $f'$. Into the hollow, the eye, and the recess is placed the sliding bolt $f^2$, for construction of which see Fig. 9. Upon the bolt is placed the collar $f^3$. Against this and against the end of the hollow journal the spring rests, the result being that the sliding bolt $f^2$ is normally held inclosed within the recess $f$ of the packer-crank.

Reference to Fig. 16 will show the gear E² to have enlargements $e^8$ of its hub, and in these, upon opposite sides, recesses $e^9$. Into these the hub of the sliding bolt may draw, as shown in Figs. 2, 3, and 4. Turning particularly to Fig. 4 it will be seen that the cross-head $f^4$ of the sliding bolt lies within the recess $f$ of the crank, but not in the recesses $e^9$ of the gear E². Clearly, then, the gear E² may rotate upon the sleeve-like journal F of the packer-shaft without turning the latter.

In Figs. 3 and 4 a lever H is shown pivoted to a lug $a^6$ of the frame A. This bar at its end $h$ rests upon the sliding bolt $e^7$, and at its end $h'$ rests upon the cross-head slide-bolt $f^2$, preferably having an eye in its end adapted to pass onto the extreme end of the said bolt.

In Fig. 3 it will be seen that the antifriction-roller at the end of the sliding bolt $e^7$ rests within the notch $e^6$, the spring of the sliding bolt $e^7$ having forced it there. The pressure upon the end $h$ of the lever H having been released, the spring $f^5$ will exert itself to force the sliding bolt $f$ to the position shown in Fig. 3, where it will be seen that the cross-head $f^4$ lies within the slot $f$ of the packer-crank F' and the recesses $e^9$ of the gear E². In consequence of this the packers will be rotated. When the gear E is in the position shown in Fig. 3, the teeth of the gear E' move freely within the recess thereof, and the gear E, being in the position there shown during all of the time of the formation of a gavel, the parts retain the position seen in that figure; but the packers having finally met with resistance in the gavel-receptacle the lever $d^2$ is forced in the direction to trip the clutching devices that put the binding mechanism proper into movement. The instant the wheel E is turned the roller of the sliding bolt $e^7$ is forced endwise and the cross-head $f^4$ forced out of the recesses $e^9$ in the gear E² and the packers are permitted to stop. (See Fig. 4.)

The bundle-compressing devices are best shown in Fig. 1 and made clear by various detail figures. Upon the needle-shaft B' is placed the needle G, which is provided with the arm $g$. I is the resistant, in the present exemplification of the invention, also a compressor. Pivoted to a lug $b$ on the main frame is the arm I, having the lug $i$. This part I will be designated hereinafter as the tripping-compressor. The arm $g$ and the tripping-compressor are side by side and so close that the arm $g$ may strike beneath the lug $i$ and lift the said tripping-compressor to position for receiving the gavel, as shown in Figs. 1 and 12. While the needle is in this position it holds the tripping-compressor erect, but while it is passing upward and performing its office of carrying the twine up to the knotting device and serves as one element of the compressing devices it cannot so hold the compressor. The tripping-compressor I must be held, and in order to yield in compressing must be sustained elastically.

In Fig. 1 is shown an arm $i'$, terminating in an antifriction-roller $i^2$. I shall treat this roller in my claims as but merely an antifriction part of the arm $i'$.

J is a bolt, against the head of which the extremity of the arm $i'$ rests, the bolt being held in position by the spring $j$. In considering this matter it must be supposed that the needle has passed upward, so that the arm $g$ no longer rests on the lug $i$. It will be seen that if the tripping-compressor I be forced outward by the bundle the spring $j$ will yield; but it is necessary to get the spring-bolt J out of the way to permit the tripping-compressor to fall to allow the passage of the bundle.

Adjacent to the hub of the needle is the escapement $g'$.

K is a latch (shown in detail in Fig. 7) having the pivot $k$. The latter enters the eye $k'$ in the main frame. It has the shoulder $k^2$ adapted to be engaged by the escapement $g'$ on the needle-hub. It is provided with an eye $k^3$. Through this eye the spring-bolt J passes, and the spring $j$ rests against the end $k^4$. It will be seen, then, that the spring tends to move the latch K so as to force the shoulder $k^3$ under the escapement $g'$ when permitted to do so. The sliding bolt J is held in place by a sleeve L, having the trunnion $l$, the latter forming a pivot that passes into the eye $l'$ of the main frame. (See Fig. 6.) Through this sleeve the bolt J extends, where it is threaded to receive the nut $j'$. The eye $k^3$ is large, so that the bolt J passes loosely therethrough and the sleeve L is pointed at $l^2$, and the lower extremity of the latch adjacent to the eye is provided with an angular projection. By means of this angular projection, and that of $l^2$, the lower extremity of the latch may rock on the bolt J. Assuming that the needle is passing upward to do its work in carrying the band, the latch will spring away and permit the escapement $g'$ to move upward. The action of the spring $j$ will have the effect of forcing the shoulder $k^2$ toward the needle-shaft, and after the needle has done its work and has started backward the escapement will come in contact with the shoulder and force the whole down, carrying with it the spring-bolt J, rocking it on the pivot of its support $l$. This will throw the head of the bolt from the position shown in Fig. 1 to that shown in Fig. 5, where the arm $i'$ is seen to have passed off from it. As the latch K can only rock on its pivot $k$, it is soon forced down so far that it swings out of contact with the escapement which in Fig. 5 it is seen passing. As soon as the needle approaches its lowermost position the arm $g$ comes in contact with the lug $i$ and forces the tripping-compressor to its home position. The packers are carried on their cranks in the usual manner, and the heel ends of the same are controlled by the links M and M, pivoted to the knotter-frame.

It is seen that I have two clutching devices, one for putting the binding devices proper into motion and stopping them and another for putting the packers into motion and stopping them—that is to say, through a train of mechanism the packers are compelled to throw themselves out of action, and I shall claim my pivoted lever that is caused to move by the holding of the driving-pinion from rotation and its consequent movement around the periphery of the driven gear because of the resistance afforded for the packers as means for permitting the packers to be thrown out of engagement, as well as permitting the binding devices to be thrown into operation.

What I claim as my invention, and desire to secure by Letters Patent, is—

1. In a grain binder the combination of the packers, the packer cranks journaled in fixed bearings, the gear $E^2$, the clutch detent lever $d^2$ pivoted coincident with the axis of the said gear $E^2$, the driving shaft and pinion supported upon said lever and adapted to give rotation to the said gear $E^2$, the clutching devices for throwing the binding mechanism in motion, and the resistant I, substantially as described.

2. In a grain binder the combination of the packers, the driven gear $E^2$ carried upon fixed journals and so connected to the said packers as to give them rotation, the clutch detent lever pivotally mounted on an axis substantially coincident with the axis of the said driven gear, the driving pinion $d$ journaled in the said lever and adapted to give rotation to the said gear, a clutching device and the resistant I, substantially as described.

3. The combination of the packers, the resistant against which the grain is packed, said packers so connected to the gear $E^2$ by clutching devices as to be intermittently driven thereby, the lever $d^2$, the pinion mounted thereon, said lever adapted to disengage a train of mechanism that shall produce disengagement of the packer shaft from the driving gear, substantially as described.

4. The combination of the driving gear $E^2$, the packer shaft, clutching mechanism connecting the said driving gear and packer shaft, the pinion $d$ mounted in a yielding bearing, the lever connecting said bearing to binder clutching devices, and connecting mechanism moved by the binding devices to disengage the clutch that connects the packer to its driving gear, all combined substantially as described.

5. The combination of the gear $E^2$ journaled in the frame-work of the binder, packing devices clutched thereto and binding devices connected thereto, the lever $d^2$ pivoted substantially coincident to the axis of the said gear, the driving shaft and pinion $d$ supported in said lever and adapted to give the said gear $E^2$ rotation, a spring for holding said lever normally in position for preventing engagement of the clutch that controls the binding devices, all combined substantially as described.

6. In a grain binder, the combination of the hollow packer shaft supported in the bearings of the main frame, the gear $E^2$ journaled therein, the said gear having the recesses $e^9$ and the packer shaft having the recess $f$, a clutch pawl supported in said packer shaft and adapted to be drawn into the recesses of the gear, and connecting mechanism adapted to be operated by the main binder gearing to force the said clutch pawl from engagement with the driving gear, substantially as described.

7. The combination of the needle pivoted in the binder frame, the compressor pivoted in the frame eccentrically thereto, the needle having the arm $g$ adapted to engage the lug $i$ and the compressor having the arm $i'$, the pivotally hung spring bolt J and the latch K, all combined substantially as described.

CHARLES A. ANDERSON RAND.

Witnesses:
 ELISE M. HALVERSON,
 ARTHUR JOHNSON.